Figure 1:
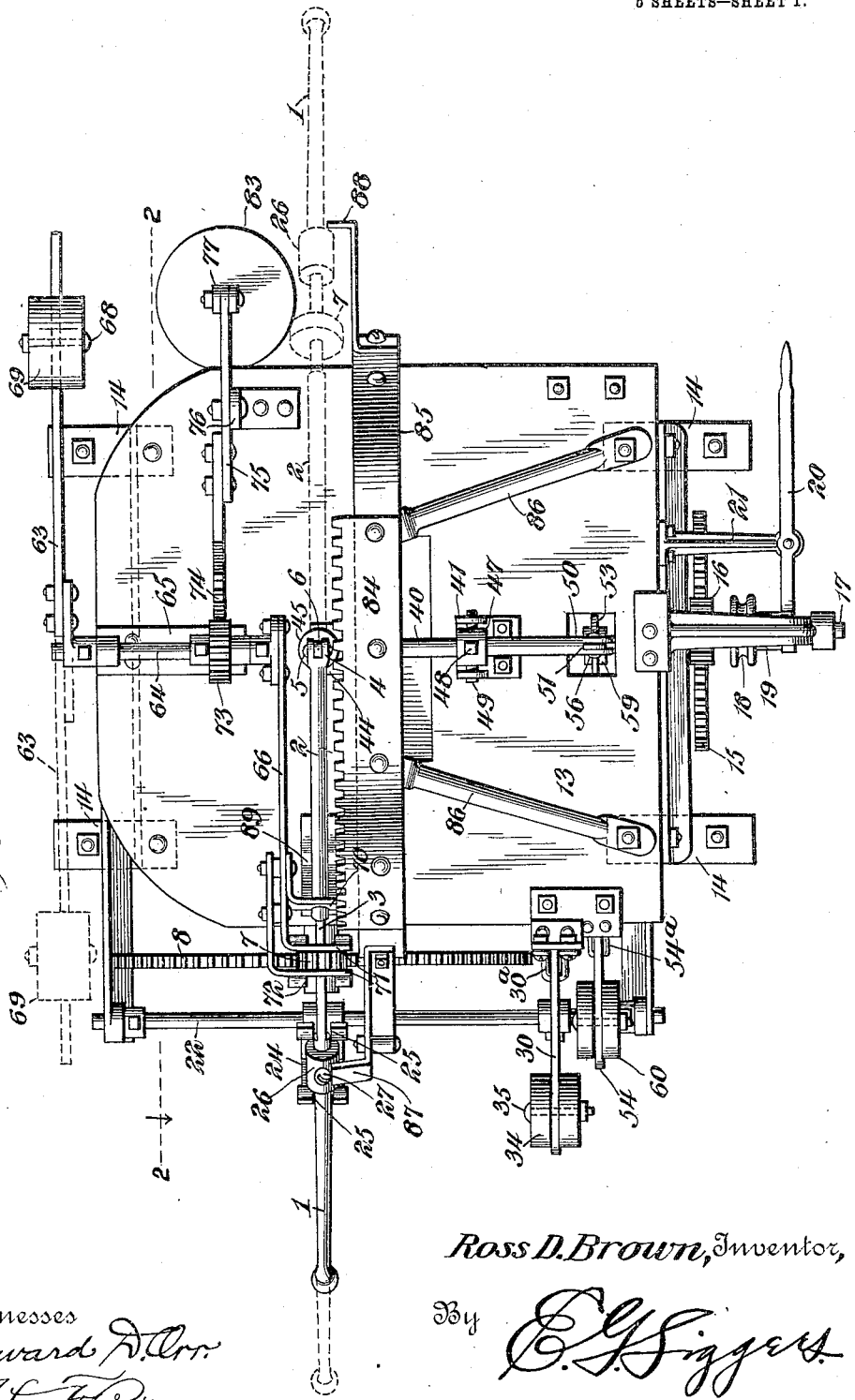

No. 838,768. PATENTED DEC. 18, 1906.
R. D. BROWN.
GLASS GATHERING MACHINE.
APPLICATION FILED NOV. 7, 1905.

5 SHEETS—SHEET 2.

Ross D. Brown, Inventor,

Witnesses
Howard D. Orr.
H. F. Riley.

By E. G. Siggers
Attorney

No. 838,768. PATENTED DEC. 18, 1906.
R. D. BROWN.
GLASS GATHERING MACHINE.
APPLICATION FILED NOV. 7, 1905.
5 SHEETS—SHEET 4.
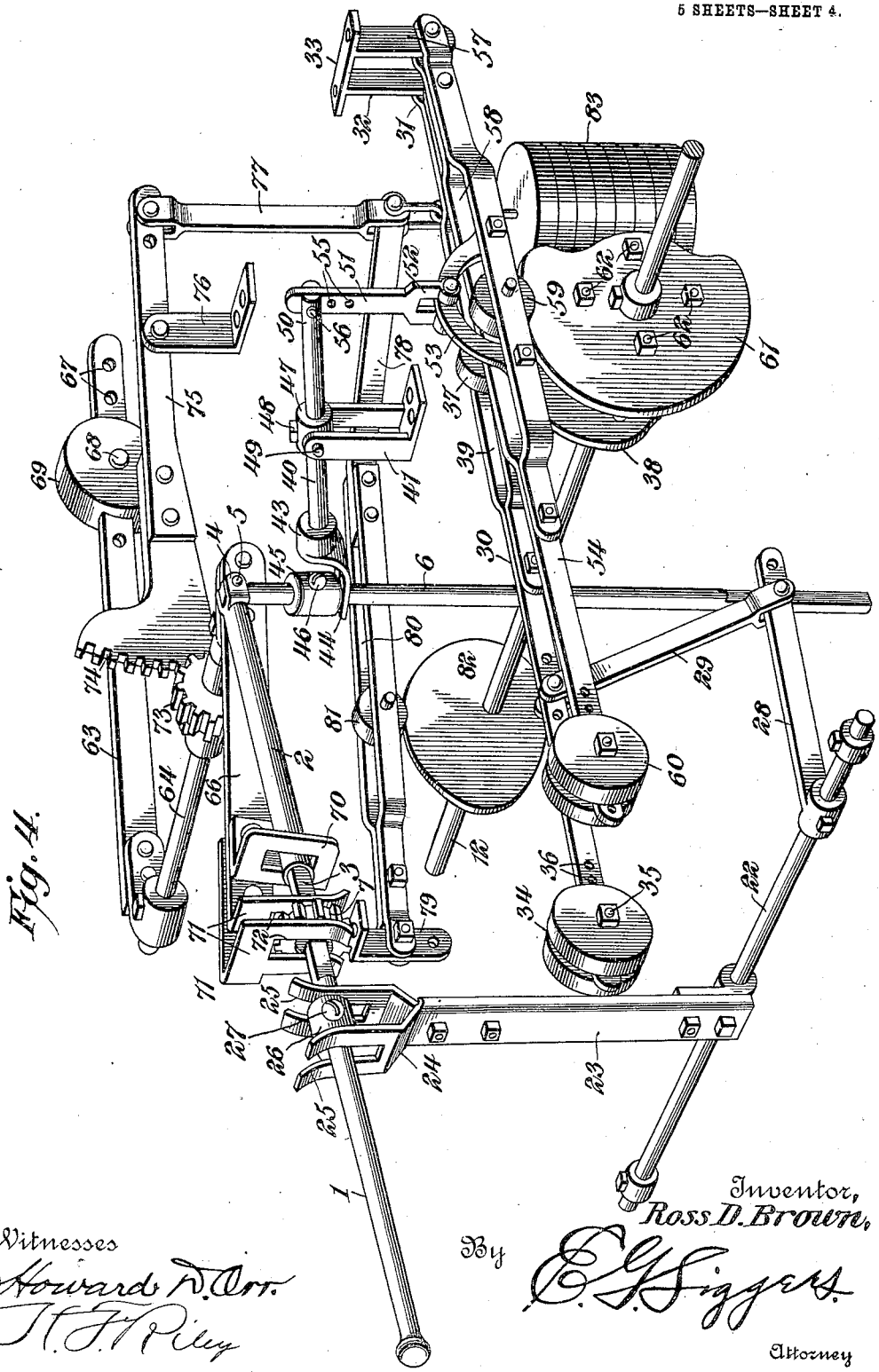
Fig. 4.
Witnesses
Howard D. Orr.
J. F. Riley
Inventor,
Ross D. Brown,
By 
Attorney No. 838,768. PATENTED DEC. 18, 1906.
R. D. BROWN.
GLASS GATHERING MACHINE.
APPLICATION FILED NOV. 7, 1905.
5 SHEETS—SHEET 5.
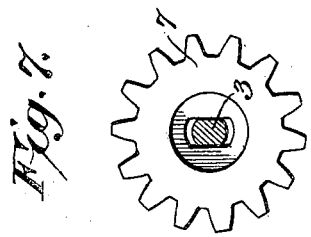
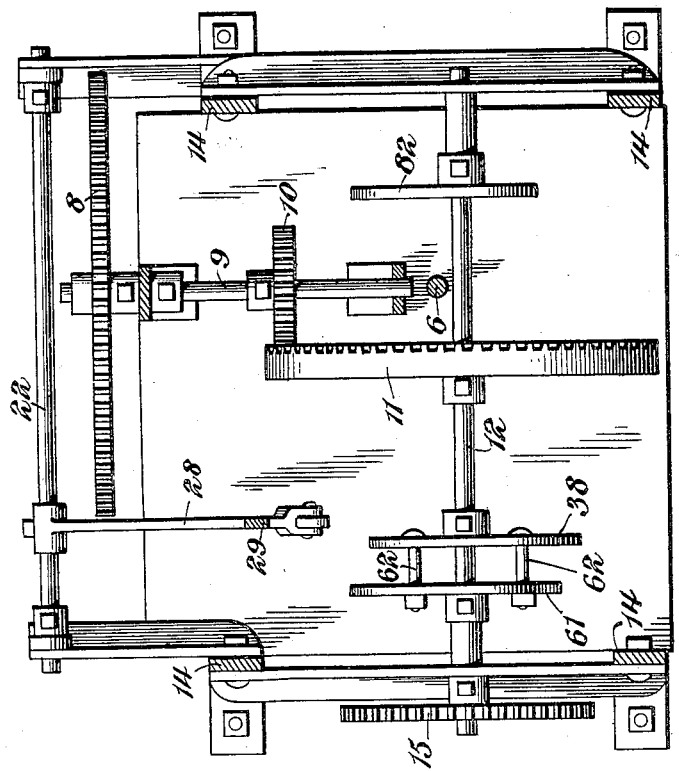
Ross D. Brown, Inventor,
Witnesses

UNITED STATES PATENT OFFICE.

ROSS D. BROWN, OF MUNCIE, INDIANA, ASSIGNOR OF ONE-THIRD TO ROBERT H. RIFFE, OF MUNCIE, INDIANA.

GLASS-GATHERING MACHINE.

No. 838,768.　　　　Specification of Letters Patent.　　　　Patented Dec. 18, 1906.

Application filed November 7, 1905. Serial No. 286,270.

*To all whom it may concern:*

Be it known that I, ROSS D. BROWN, a citizen of the United States, residing at Muncie, in the county of Delaware and State of Indiana, have invented a new and useful Glass-Gathering Machine, of which the following is a specification.

The invention relates to improvements in glass-gathering machines.

The object of the present invention is to improve the construction of glass-gathering machines and to provide a simple and comparatively inexpensive one adapted to move a rotating gathering instrument into a tank and capable after the gathering instrument has been extended into the tank of dropping it to the surface of the glass to permit it to gather its quota and of then raising the instrument substantially in a vertical direction, so as to cut off the thread of the glass.

A further object of the invention is to provide a machine of this character adapted after the gathering instrument has gathered its quota of glass of withdrawing the same from the tank and of swinging it backward in a straight vertical plane to the rear of the machine over a mold and of stopping the rotation of the gathering instrument at the limit of such backward movement to cause the glass to drop into the mold.

The invention also has for its object to dispense with the carriage or frame heretofore employed for moving the gathering instrument to and from the glass and to enable the gathering instrument to be directly actuated both in introducing it into and removing it from the tank and swinging it to and from the mold.

Furthermore, the invention has for its object to provide simple means for controlling the downward movement of the gathering instrument within the tank and for increasing such movement as the glass is consumed, whereby the machine will properly gather the glass at any level of the latter within the tank.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

Figure 2:
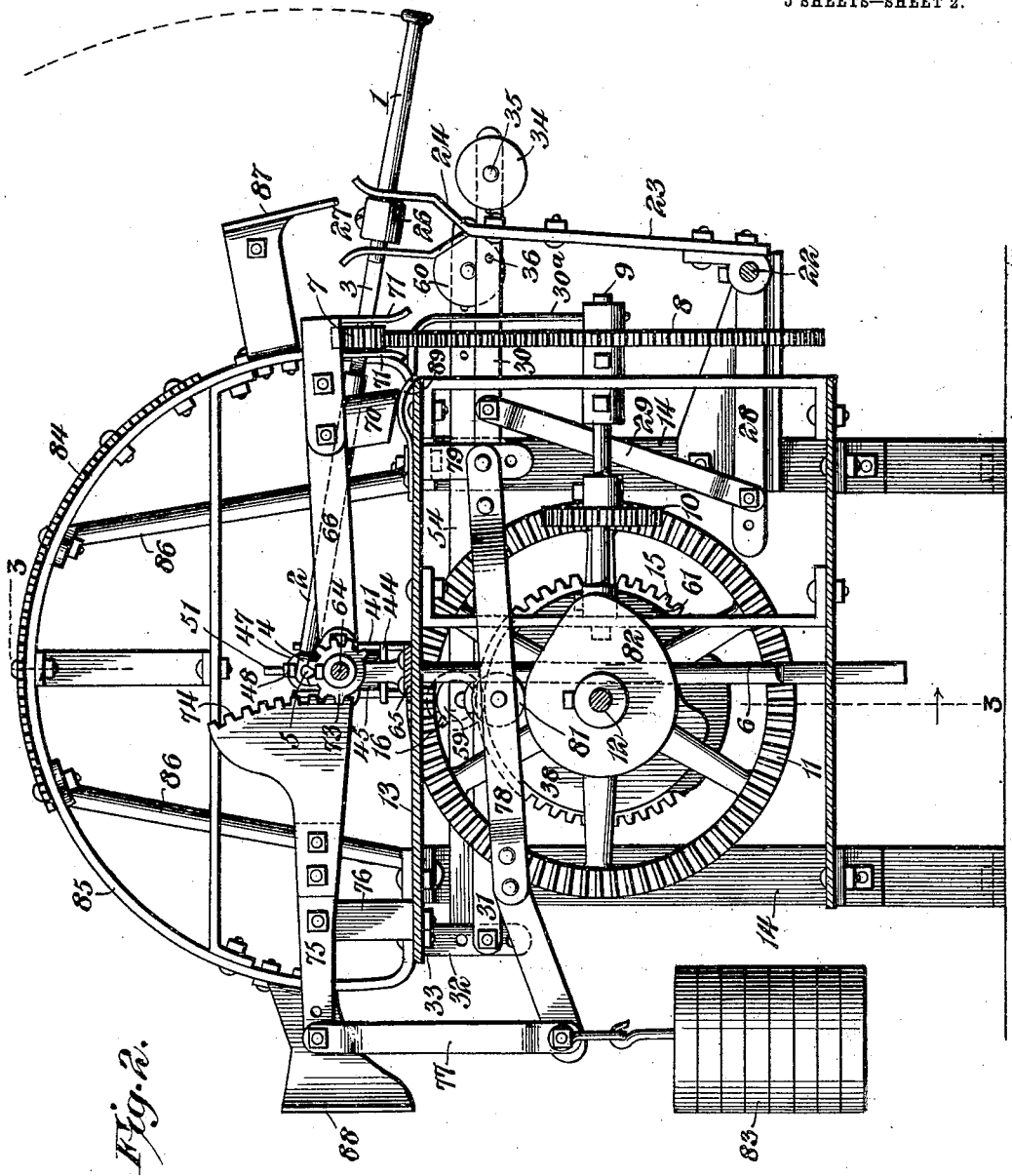
Figure 3:
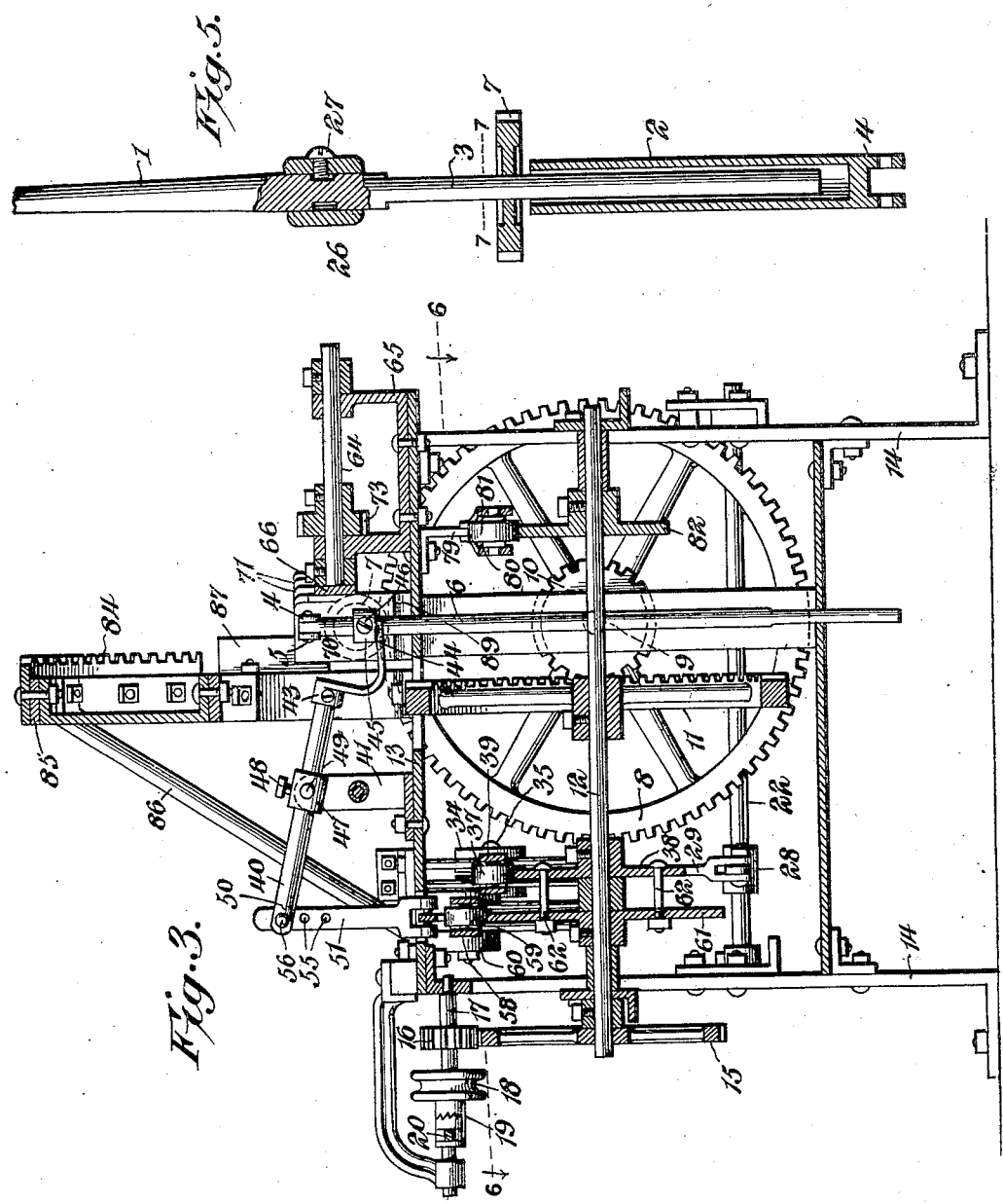

In the drawings, Figure 1 is a plan view of a glass-gathering machine constructed in accordance with this invention. Fig. 2 is a vertical longitudinal sectional view on the line 2 2 of Fig. 1. Fig. 3 is a transverse sectional view on the line 3 3 of Fig. 2. Fig. 4 is a perspective view illustrating the arrangement of the cams and weighted levers for actuating the gathering instrument. Fig. 5 is a detail sectional view illustrating the construction of the extensible gathering instrument. Fig. 6 is a horizontal sectional view on the line 6 6 of Fig. 3. Fig. 7 is a detail sectional view on the line 7 7 of Fig. 5.

Like numerals of reference designate corresponding parts in all the figures of the drawings.

1 designates an extensible gathering instrument consisting of inner and outer telescopic sections or members, the inner section 2 being tubular and slidably receiving the inner portion 3 of the outer section, which terminates in a head or enlargement for gathering glass. The inner end 4 of the gathering instrument is bifurcated and is pivoted by a pin 5 or other suitable fastening device to a vertically-movable rod 6, which is adapted to be moved upward and downward, as hereinafter more fully described, to raise and lower the outer end of the gathering instrument. The inner portion 3 of the outer section of the gathering instrument is reduced at opposite sides to form flat faces and to provide a non-circular portion for engaging a pinion 7, which is thereby slidably connected with the gathering instrument. The other edges of the portion 3 of the outer section are rounded to enable the outer section to rotate freely within the inner tubular section 2, which forms a bearing for the outer section. The opening of the pinion, which conforms generally to the configuration of the portion 3 of the gathering-iron, is slightly larger than the same to permit the necessary play of the parts; but instead of slidably connecting the pinion and the gathering-iron in the manner shown any other suitable means, such as a key and keyway, may be employed for this purpose.

The pinion, which imparts a rotary movement to the gathering-iron, meshes with a large vertically-disposed gear 8, and it forms a fulcrum and guide for the gathering instrument while the same is being introduced into and removed from the tank. The gathering instrument is extended by the means hereinafter described to introduce it into the tank, and it is tilted or oscillated on the pinion to raise and lower the point of the gathering instrument, which movement is substantially vertical and is effected after the instrument has been extended into the tank. The rotary movement enables the gathering instrument to pick up its quota of glass and retain the same on it, as will be readily understood, and the large gear 8, which is disposed transversely of the front of the machine, is mounted on a horizontal shaft 9, disposed longitudinally of the machine and journaled in suitable bearings of the frame thereof. The longitudinal shaft 9 is provided in rear of the large gear 8 with a pinion 10, which is driven by a gear 11 of a main transverse shaft 12, also journaled in suitable bearings of the frame of the machine and carrying the cams, hereinafter described, for effecting the several movements of the gathering instrument. The frame of the machine may be constructed in any preferred manner, and it preferably consists of a horizontal top portion 13 and supporting corner-standards 14, which are suitably connected and braced to afford the requisite strength.

The main transverse shaft, which may be driven by any suitable means, is preferably provided with a gear 15, meshing with a pinion 16 of a short counter-shaft 17, which carries a pulley 18, adapted to be connected by a belt with a suitable driving-pulley. A clutch 19 and a shifting-lever 20 are provided for throwing the machine into and out of operation. The shifting-lever is fulcrumed on an arm 21, extending from the frame of the machine, as clearly illustrated in Fig. 1 of the drawings; but the lever may be arranged in any other desired manner, as will be readily understood.

In order to move the gathering instrument into and out of the tank, a lower transverse rock-shaft 22 is employed. This rock-shaft, which is journaled in suitable bearings of the frame of the machine, is provided with an upwardly-extending arm 23, having a forked upper portion 24 to receive the gathering instrument. The sides of the fork 24 are provided with slots or openings 25, through which the outer section or member of the gathering instrument extends, the said outer section being provided with an adjustable collar 26, arranged within the fork between the sides thereof and secured to the gathering instrument by means of a set-screw 27. By adjusting the collar on the outer section or member of the gathering instrument the latter is positioned properly with relation to the movement of the forked arm of the rock-shaft 22. This adjustment of the gathering instrument enables it to extend the desired distance into the tank from which the glass is to be gathered. When the rock-shaft is actuated, the upwardly-extending arm 23 is oscillated and the outer section or member of the gathering instrument is moved longitudinally through the pinion 7 and into and out of the tubular inner section or member 2. The slots or openings 25 extend downward from the upper ends of the sides of the fork to provide an open bearing or seat for the gathering instrument to permit the same to be swung from the forked arm 23 and the seat thereof, as hereinafter explained.

The rock-shaft 22 is provided with an inwardly-extending arm 28, disposed in an approximately horizontal position and connected by an upwardly-extending link 29 with a weighted lever 30. The weighted lever 30 is fulcrumed at one end 31 on the frame, preferably by means of a depending arm 32 of a bracket 33, and its other end is provided with an adjustable weight 34, adapted to be moved inward and outward to vary the downward pressure of the lever. The weight 34 may be adjusted on the lever by any suitable means—such as a bolt 35 and perforations 36, formed in the lever 30—to permit the bolt to be arranged at different points on the the same. The weighted lever 30, which operates in a suitable guide 30$^a$, is provided with an antifriction-wheel 37, which rests upon a cam 38 and which is mounted in an opening 39 of the lever 30. The cam 38, which is mounted on the main transverse shaft 12, is adapted to positively swing the lever 30 upward, and it permits the same to swing downward to rock the shaft 22 and move the extensible gathering instrument outward and inward to advance it into the tank and to withdraw it therefrom. The machine is properly timed, so that the gathering instrument will be first advanced into the tank the proper distance and then moved directly downward to the surface of the glass to avoid a skimming movement along the surface of the glass, and thereby avoid abruptly breaking the glass when the gathering instrument is lifted therefrom. The upward movement of the gathering instrument from the glass will be in substantially a vertical direction and not backward or forward over the surface of the glass, and the glass will not be suddenly broken by the withdrawal of the gathering instrument, as is the case with machines employing a skimming movement during the gathering operation.

The upward and downward movement of the outer end of the gathering instrument is effected by means of a transversely-disposed oscillatory lever 40, fulcrumed at an intermediate point in a bracket 41 and provided at its inner end with a head 43, which has a forked flange 44, straddling the vertically-movable rod 6 and forming a seat for an adjustable collar 45. The collar 45 is secured in its adjustment by a set-screw 46, and it enables the rod 6 and the gathering instrument to be adjusted independently of the lever 40. The lever 40 is provided at an intermediate point with an adjustable sleeve 47, secured to the lever by a set-screw 48 and provided with opposite pivots or trunnions 49, which are arranged in suitable bearings of the bracket 41. The bracket 41, which is suitably secured to the top of the frame of the machine, is provided with vertical sides spaced apart to receive the lever 40. The outer end 50 of the lever is slotted or bifurcated to receive a link 51, which is forked at its lower end 52 and which is pivoted to an arched bar or piece 53 of a weighted lever 54. The upper portion of the link 51 is provided at intervals with perforations 55, and the outer end of the lever is adjustably secured to the link by means of a pin 56, adapted to be placed in any one of the perforations 55. The lever 54 is fulcrumed at one end on a depending arm 57 of the said bracket 33, and it is provided between its ends with an opening 58, in which is mounted an antifriction-wheel 59, over which the arched bar or piece 53 extends. The other end of the lever 54 operates in a guide 54ª and is provided with an adjustable weight 60, preferably constructed and arranged similar to the weight 34 of the lever 30. The antifriction-wheel 59 rests upon a cam 61, which is also mounted on the shaft 12 and which is arranged to drop the outer arm of the lever 40 at the completion of the outward movement of the extensible gathering instrument. This downward movement of the outer arm of the lever 40 lifts the inner end of the gathering instrument and moves the outer or gathering end of the same downward to the surface of the glass.

The cams are adjustably mounted on the shaft 12 and are preferably braced by connecting-bolts 62, extending across the space between the cams 38 and 61 and piercing the same, as clearly illustrated in Fig. 3 of the drawings. After the gathering instrument has gathered its quota of glass it is lifted from the glass of the tank by the cam 61, which raises the weighted lever 54, thereby swinging the outer arm of the transverse lever 40 upward. This permits the inner end of the gathering instrument to descend, the weight of the vertically-movable rod 6 being sufficient to insure a downward movement of the inner end of the gathering instrument. The vertically-movable rod 6 may be positively moved downward by the lever 40, as will be readily understood. This can be effected by arranging an adjustable collar beneath the fork 44 in addition to the collar above the same. As this is obvious, illustration thereof is deemed unnecessary. At the completion of the upward movement of the outer end of the gathering instrument the latter is withdrawn from the tank by a backward movement of the forked arm 23, which backward movement is effected by a downward movement of the weighted lever 30 due to the rotary movement of the cam 38.

After the gathering instrument is withdrawn from the tank it is swung backward over the top of the machine in a vertical plane from the position illustrated in full lines in Fig. 1 to that shown in dotted lines to deposit the glass in a mold. During this oscillatory movement of the gathering instrument it is counterbalanced by a weighted arm 63 of a vibratory shaft 64, disposed transversely of the machine and journaled in suitable bearings of a bracket 65 and provided with an arm 66, which is connected with and which loosely receives the gathering instrument. The arm 63, which is arranged at the outer end of the vibratory shaft 64, is provided at its outer portion with perforations 67, adapted to receive a fastening device 68, which also pierces a weight 69. The weight 69 is adapted to be adjusted inward and outward on the arm 63 to properly counterbalance the weight of the gathering instrument. The bracket 65, which is suitably mounted on the frame of the machine, is provided with upwardly-extending arms having bearing-openings to receive the shaft 64. The arm 66, which is arranged at the inner end of the shaft 64, is provided with a laterally-extending flange or portion 70, having an opening, which loosely receives the inner tubular member 2 of the gathering instrument. The arm 66 is also provided with a slotted guide, which receives the pinion 7 and which maintains the same in proper position to mesh with the gear-wheel 8 when the gathering instrument is swung forward from the back of the machine to the front thereof. This slotted guide is composed of two laterally-projecting flanges 71, having slots or openings 72 extending upward from the lower ends of the flanges 71 and receiving the portion 3 of the gathering instrument, which has a limited play on the arm 66.

The vibratory shaft is provided with a mutilated pinion 73, which meshes with an oscillatory toothed segment 74 of a lever 75. The lever 75, which is fulcrumed between its ends on an upwardly-extending arm of a bracket 76, has its outer or rear arm connected by a link 77 with a weighted lever 78, disposed longitudinally of the machine in parallelism with the weighted levers 30 and 54. The lever 78, which is adjustably fulcrumed at its front end on the depending arm of a bracket 79, is provided with an opening 80, in which is mounted an antifriction-wheel 81. The antifriction-wheel 81 rests upon a cam 82 and is maintained in engagement with the same by a weight 83, which is suspended from the outer or rear end of the lever 78 and which is adapted to actuate the gathering instrument in its oscillatory movement from the back of the machine to the front thereof. The cam 82 is mounted on the main transverse shaft, and it is adapted to move the weighted lever 78 upward, and thereby oscillate the lever 75, which carries the toothed segment 74. The upward movement of the weighted lever 78 moves the toothed segment 74 downward and rotates the shaft 64 to swing the gathering instrument from the front of the machine to the back thereof.

The gathering instrument is rotated during its oscillatory stroke or movement to retain the glass on it by means of a curved rack 84, provided with teeth arranged to mesh with the pinion 7. The curved rack is mounted on an arch 85, extending from the front to the back of the machine and supported by suitable braces 86. The toothed rack, which positively rotates the gathering instrument, terminates short of the rear end of the arch, so that the rotation of the gathering instrument will cease at the limit of its backward movement to permit the glass to drop into the mold, the glass being cut off from the gathering instrument by the attendant. The arch carries front and rear guards 87 and 88, having laterally-extending guiding portions and provided with shanks which are secured to the arched bar 84. These guards limit the outward movement of the outer section of the extensible gathering instrument and guide the adjustable collar to the seat formed by the fork of the arm 23 and also to prevent any outward movement of the gathering instrument from carrying the glass beyond the mold. The gathering instrument is positively swung backward by the action of the cam 82, and in order to prevent any undue jar of the parts when the gathering instrument is swung forward by the weight 83, a cushion or buffer 89 is provided. This cushion or buffer 89, which is arranged to be engaged by the laterally-extending flange 70, consists of a bowed spring presenting an upper convex face to the flange 70 and secured at one end to the top of the frame. The other end of the buffer or cushion is free to permit the spring to yield to and cushion the gathering instrument.

It will be seen that the extensible gathering instrument is adapted to dispense with the carriage or frame usually employed for moving a gathering instrument into and out of a tank and that the downward movement to dip the gathering instrument into the glass occurs at the end of the inward movement, and thereby prevents a skimming movement on the surface of the glass and the consequent sudden breakage of the thread of the glass when a gathering instrument is withdrawn by such movement. Also it will be clear that the machine is readily adjustable to cause the gathering instrument to dip into the tank the desired distance and that the dipping movement may be increased as the glass within the tank is consumed. Furthermore, it will be clear that the extensible gathering instrument may be readily adjusted to extend into the tank the desired distance and that as the gathering instrument in swinging from the tank to the mold does not have any lateral movement a number of machines may be placed closely around a tank or pot.

Having thus fully described my invention, what I claim as new, and desire to secure by Letters Patent, is—

1. A glass-gathering machine provided with a rotary gathering instrument having an extensible section, and means for moving the extensible section into and out of a tank or pot.

2. A glass-gathering machine provided with a pivotally-mounted extensible rotary gathering instrument, means for lengthening and shortening the gathering instrument to extend it into a tank or pot and to withdraw it therefrom, and means for swinging the gathering instrument to and from the tank or pot.

3. A glass-gathering machine provided with a pivotally-mounted extensible rotary gathering instrument, means for lengthening and shortening the gathering instrument to extend it into a tank or pot and to withdraw it therefrom, and means for swinging the gathering instrument in substantially a vertical plane to carry the said instrument to and from the tank or pot.

4. A glass-gathering machine provided with an extensible rotary gathering instrument composed of telescopic sections, and means for lengthening and shortening the gathering instrument to extend the same into a tank or pot.

5. A glass-gathering machine provided with an extensible gathering instrument composed of telescopic sections, one of the sections being slidable and rotatable on the other section, means for lengthening and shortening the gathering instrument to extend the same into a tank or pot and to withdraw it therefrom, and means for imparting a rotary movement to the rotatable section of the gathering instrument.

6. A glass-gathering machine provided with an extensible gathering instrument composed of telescopic sections, one of the sections being pivotally mounted and the other section having a sliding and rotary movement, and means for operating the gathering instrument.

7. In a glass-gathering machine, the combination of an extensible gathering instrument, means for varying the length of the same to extend the instrument into a tank or pot and to withdraw it therefrom, and means for fulcruming the gathering instrument at an intermediate point and for oscillating it on such fulcrum to move the outer end of the gathering instrument upward and downward to and from the surface of the glass without skimming the gathering instrument over the surface of the glass.

8. In a glass-gathering machine, the combination of an extensible gathering instrument pivotally mounted at its inner end and adapted to be lengthened and shortened to extend it into and withdraw it from a tank or pot, and means for fulcruming the gathering instrument at an intermediate point and for changing the elevation of the pivotally-mounted inner end to move the outer end of the instrument to and from the surface of the glass by a direct upward-and-downward movement without skimming the instrument over the surface of the glass.

9. In a glass-gathering machine, the combination of a gathering instrument composed of inner and outer sections or members, the outer section or member being slidable on the inner section or member to lengthen and shorten the instrument, gearing for rotating the outer section or member, said gearing forming an intermediate fulcrum for the gathering instrument, and means for oscillating the gathering instrument on such fulcrum to dip it into and raise it from the glass.

10. In a glass-gathering machine, the combination of a pivotally-mounted gathering instrument composed of inner and outer sections or members, the outer section or member being slidable on the inner section or member to lengthen and shorten the instrument, gearing for rotating the outer section or member, said gearing forming an intermediate fulcrum for the gathering instrument, and means for oscillating the gathering instrument on such fulcrum to dip it into and raise it from the glass, and means for swinging the gathering instrument on its inner pivoted end to carry it to and from the tank or pot.

11. In a glass-gathering machine, the combination with a rotary gathering instrument, means for supporting the same, and means for moving the gathering instrument independently of the supporting means to extend the instrument into a tank or pot and to withdraw it therefrom.

12. In a glass-gathering machine, the combination of a pivotally-mounted gathering instrument arranged to swing vertically, a vibratory shaft connected with the gathering instrument, a pinion mounted on the shaft, an oscillatory toothed segment meshing with the pinion, and means for oscillating the segment to swing the gathering instrument to and from a tank or pot.

13. In a glass-gathering machine, the combination of a pivotally-mounted gathering instrument, a horizontal shaft having an arm connected with the gathering instrument, a pinion mounted on the shaft, and an oscillatory toothed segment meshing with the pinion for swinging the gathering instrument in a vertical plane to carry the same to and from a tank or pot.

14. In a glass-gathering machine, the combination of a pivotally-mounted extensible gathering instrument arranged to swing vertically, a rock-shaft having an arm for moving the gathering instrument inward and outward, and means for swinging the gathering instrument on its pivot.

15. In a glass-gathering machine, the combination of a pivotally-mounted extensible gathering instrument, a substantially upright oscillatory arm having a seat for the gathering instrument and adapted to move the same inward and outward to carry it into and withdraw it from a tank or pot, and means for swinging the gathering instrument on its pivot to move it to and from a tank or pot.

16. In a glass-gathering machine, the combination of an extensible gathering instrument, and an oscillatory arm having a seat for the gathering instrument and adapted to move the same inward and outward, said gathering instrument having adjustable means for engaging the arm, whereby it may be extended a greater or less distance into the tank or pot.

17. In a glass-gathering machine, the combination of an extensible gathering instrument, an arm provided with a fork slotted to receive the gathering instrument, and adjustable means carried by the gathering instrument and arranged within the fork for extending the gathering instrument a greater or less distance into the tank or pot.

18. In a glass-gathering machine, the combination of an extensible gathering instrument, a rock-shaft having an arm arranged to move the gathering instrument inward and outward, a weighted lever connected with the rock-shaft, and a cam for operating the weighted lever.

19. In a glass-gathering machine, the combination of a vertically-movable rod, a gathering instrument pivotally mounted on the rod, means for fulcruming the gathering instrument, and means for actuating the rod to dip the gathering instrument into the glass of a tank or pot and to raise it therefrom.

20. In a glass-gathering machine, the combination of a vertically-movable rod, a gathering instrument pivotally mounted on the rod, means for fulcruming the gathering instrument, an oscillatory lever for actuating the rod to dip the gathering instrument into the glass of a tank or pot, and means for actuating the lever.

21. In a glass-gathering machine, the combination of a vertically-movable rod, a gathering instrument pivotally mounted on the rod, means for fulcruming the gathering instrument, an oscillatory lever for actuating the rod to dip the gathering instrument into the glass of a tank or pot, and adjustable means for actuating the lever, whereby the downward movement of the gathering instrument into the tank or pot may be increased as the glass thereof is consumed.

22. In a glass-gathering machine, the combination of a vertically-movable rod, a gathering instrument pivotally mounted on the rod, means for fulcruming the gathering instrument independently of the rod, the latter forming a weight for moving the gathering instrument on its fulcrum to raise it from the glass of a tank or pot, a lever for moving the rod upward to dip the gathering instrument into the glass, and means for actuating the lever.

23. In a glass-gathering machine, the combination of a vertically-movable rod, a gathering instrument pivotally mounted on the rod, means for fulcruming the gathering instrument independently of the rod, the latter forming a weight for moving the gathering instrument on its fulcrum to raise it from the glass of a tank or pot, a lever for moving the rod upward to dip the gathering instrument into the glass, and adjustable means engaged by the lever and mounted on the rod for raising and lowering the same independently of the lever.

24. In a glass-gathering machine, the combination of a rod, an extensible gathering instrument pivotally mounted on the rod, a rock-shaft having an arm for moving the gathering instrument inward and outward, and independent means for successively actuating the rock-shaft and the rod to first extend the gathering instrument into a tank or pot and then dip the instrument into the glass without skimming the same over the surface thereof.

25. In a glass-gathering machine, the combination of a rod, an extensible gathering instrument pivotally mounted on the rod, a rock-shaft having an arm for extending the gathering instrument, a lever for raising the rod, and independent means for actuating the rock-shaft and the lever, said means embodying weighted levers and cams arranged to successively actuate the weighted levers.

26. In a glass-gathering machine, the combination of a pivotally-mounted gathering instrument, a shaft having an arm for swinging the instrument, a pinion mounted on the shaft, a lever having a toothed segment meshing with the pinion, a weighted lever connected with the said lever, and a cam for moving the weighted lever in one direction, such lever being movable in the opposite direction by its weight.

27. In a glass-gathering machine, the combination of an oscillatory gathering instrument, a pinion carried by the instrument, and a fixed rack arranged in the path of the pinion for rotating the gathering instrument during the oscillation thereof.

28. In a glass-gathering machine, the combination of an oscillatory gathering instrument arranged to swing in a vertical plane to carry it to and from a tank or pot, a pinion carried by the gathering instrument, and an arched bar arranged in the path of the pinion for rotating the gathering instrument while the same is being swung from the tank or pot.

29. In a glass-gathering machine, the combination of a pivotally-mounted extensible gathering instrument, a pinion mounted on the extensible section or member of the gathering instrument, an oscillatory arm for actuating the gathering instrument, said arm being provided with a guide or keeper receiving the pinion, a gear arranged to rotate the pinion while the gathering instrument is being introduced into and removed from a tank or pot, and an arched rock-bar arranged in the path of the pinion to rotate the gathering instrument while it is swung from the tank or pot.

30. In a glass-gathering machine, the combination of a pivotally-mounted extensible gathering instrument, means for lengthening and shortening the instrument to move it into and out of a tank or pot, means for oscillating the instrument to swing it to and from the tank or pot, and front and rear guides arranged to limit the outward movement of the gathering instrument during the oscillation thereof.

31. In a glass-gathering machine, the combination of a pivotally-mounted extensible gathering instrument, an upright oscillatory arm having a seat to receive the gathering instrument and adapted to lengthen and shorten the same, a gear mounted on the gathering instrument, a curved rack-bar arranged in the path of the gear for rotating the gathering instrument while it is being swung from the tank or pot, and front and rear guides for limiting the outward movement of the gathering instrument to deposit the glass into the mold and to guide the instrument back to its seat in the said arm.

32. In a glass-gathering machine, the combination of a pivotally-mounted extensible gathering instrument, a device mounted on the gathering instrument, an oscillatory arm having a seat to receive the instrument and the said device thereof, means for swinging the gathering instrument vertically on its pivot, and means for engaging the said device for limiting the upward movement of the gathering instrument.

33. In a glass-gathering instrument, the combination of a pivotally-mounted extensible gathering instrument, an adjustable device on the said instrument, an oscillatory arm receiving the instrument and the adjustable device thereof, means for swinging the instrument in a vertical plane to carry the same to and from the tank or pot, and front and rear guides arranged to engage the adjustable device at the ends of such swinging movement.

34. In a glass-gathering machine, the combination of an oscillatory gathering instrument, gearing for actuating the gathering instrument, means embodying a weighted lever and a cam for operating the gearing, the cam being arranged to actuate the gathering instrument in its movement from the tank or pot, and means for cushioning the gathering instrument when actuated by the weight of the lever.

35. In a glass-gathering machine, the combination of a pivotally-mounted gathering instrument, a vibratory shaft provided with arms, one of the arms being connected with the gathering instrument and the other arm being weighted for counterbalancing the instrument, and means for actuating the shaft to swing the gathering instrument to and from the tank or pot.

36. In a glass-gathering machine, the combination of an oscillatory gathering instrument, means for oscillating the same, and means for imparting a rotary movement to the gathering instrument by and through the oscillatory movement thereof, so that such rotation ceases upon the completion of the oscillatory stroke or movement.

In testimony that I claim the foregoing as my own I have hereto affixed my signature in the presence of two witnesses.

ROSS D. BROWN.

Witnesses:
C. H. ELLIS,
M. SLATER.